United States Patent [19]

Priddy

[11] 4,275,182

[45] Jun. 23, 1981

[54] PROCESS FOR THE PREPARATION OF IMPROVED STYRENE ACRYLIC ACID COPOLYMERS

[75] Inventor: Duane B. Priddy, Coleman, Mich.

[73] Assignee: The Dow Chemical Company, Midland, Mich.

[21] Appl. No.: 852,411

[22] Filed: Nov. 17, 1977

[51] Int. Cl.$^3$ .................... C08F 212/08; C08F 220/06
[52] U.S. Cl. .................................... 526/109; 526/227; 526/232; 526/317
[58] Field of Search ................ 526/317, 64, 109, 227, 526/232

[56] References Cited

U.S. PATENT DOCUMENTS

| | | | |
|---|---|---|---|
| 2,866,767 | 12/1958 | Fang | 526/317 |
| 3,035,033 | 5/1962 | Schweitzer et al. | 526/64 |
| 3,839,308 | 10/1974 | Carrock | 526/317 |

Primary Examiner—Harry Wong, Jr.
Attorney, Agent, or Firm—R. B. Ingraham

[57] ABSTRACT

Styrene-acrylic acid or styrene-methacrylic acid copolymers having improved physical properties are prepared by the solution copolymerization of styrene and acrylic acid and/or methacrylic acid at a temperature between 110° and 150° C. in the presence of certain tertiary butyl peroxides.

3 Claims, No Drawings

PROCESS FOR THE PREPARATION OF IMPROVED STYRENE ACRYLIC ACID COPOLYMERS

Copolymers of styrene and acrylic acid and/or methacrylic acid and various methods for the preparation are well known. Such copolymers are disclosed in the following U.S. Pat. Nos. 1,933,052; 2,970,070; 3,000,851; 3,035,033; 3,056,764; 3,216,964; and 3,394,113.

U.S. Pat. No. 3,035,033 discloses a method for preparing molding grade copolymers containing from about 1 to 30 weight percent acrylic acid copolymerized with styrene. By the term "molding grade copolymers" is meant polymers suitable for molding either by injection or extrusion molding. The process employed essentially is a solution polymerization technique utilizing a continuously recirculating coil. A monomer mixture is continuously added to the coil and a solution of the polymer in monomer and optionally a solvent such as ethylbenzene is continuously removed from the coil and the polymer recovered. U.S. Pat. No. 3,035,033 states:

"For successful operation of the process, it is essential that all steps up to the withdrawal of the portion of the polymerizing system be conducted in the substantial absence of iron. Best results are obtained when all iron is effectively excluded from the polymerization system. Thus the use of apparatus constructed of ordinary iron and steel is prohibited. Elemental or ionic iron even in a concentration of 10 parts per million or less has such a retardant effect on the rate of polymerization as to preclude acceptable polymerization rates. Even the common stainless steels, when used as materials of construction, retard the rate of polymerization somewhat, although not prohibitively. A further disadvantage of the presence of iron is the discoloration of the resultant copolymeric product and also the increase in the thermal instability of the product. For the latter reasons is it preferred to exclude iron from all steps of the process including those relating to withdrawal of the copolymeric product and subsequent processing steps, such as devolatilization, grinding and the like. Materials of construction, such as non-ferrous alloys, nickel, glass-lined steel, and the like, are well-adapted for use in carrying out the process and, when so carried out, the copolymeric product has maximum and reproducible properties."

For some applications, such polymer had less than desired properties, for example, fogging on molding and heat distortion. Desirable molding grade polymers are processed in molding apparatus in a minimal period of time, thus minimizing investment in machinery, labor, and the like.

It would be desirable if there were available an improved styrene-acrylic acid or methacrylic acid copolymer having improved toughness.

It would be desirable if there were available a process which would prepare improved styrene-(meth)acrylic acid copolymers of improved toughness and higher heat distortion temperatures.

It would also be desirable if there were available a process for the preparation of styrene-(meth)acrylic acid copolymers which had a reduced tendency to fog when molded.

These benefits and other advantages in accordance with the present invention are achieved in a process for the preparation of molding grade polymers having polymerized therein from about 1 to 30 parts by weight of acrylic acid, methacrylic acid or mixtures thereof and from about 70 to 99 parts by weight of styrene wherein a stream of monomeric mixture containing styrene and (meth)acrylic acid is passed to a recirculating polymerizing zone and at least a portion of the stream polymerized to form styrene-(meth)acrylic acid copolymers, the improvement which comprises maintaining the polymerization temperature between about 110° C. and 150° C. and initiating polymerization with a free radical generating initiator.

Preferably such initiator is an organic peroxide selected from the group consisting of tertiarybutyl peroxy ketals and tertiarybutyl peresters. Such initiators include ketals such as 1,1-bis(t-butylperoxy)cyclohexane, 1,1-bis(t-butylperoxy)-3,3,5-trimethylcyclohexane, 2,2-bis(t-butylperoxy)butane and 2,2-bis(t-butylperoxy)hexane. Other catalysts or free radical polymerization initiators such as t-butyl peresters such as t-butyl perbenzoate and t-butyl peracetate may be used but do not show as much advantage over thermally produced resins as the preferred catalysts do.

Styrene, acrylic acid, methacrylic acid and free radical initiating compounds of commercial purity are satisfactory for the practice of the method of the invention.

If desired, solvents such as ethyl benzene, benzene, toluene, methylethyl ketone, methylisobutyl ketone and the like may be employed to reduce the viscosity of the reaction mixture and improve heat transfer.

The present invention is an improvement on the process disclosed in U.S. Pat. No. 3,035,033, the teachings of which are herewith incorporated by reference thereto. The process of the present invention differs from that disclosed in U.S. Pat. No. 3,035,033 in that the polymerization temperature range is lower than the range disclosed in the patent and that specific peroxy free radical initiators are employed, otherwise polymerization procedures and polymer recovery are as described in the patent. The method of the present invention permits polymerization in reactors which have relatively large amounts of iron some of which is taken up by the polymerization mixture. If the material being polymerized without free radical initiator is contained in a stainless steel reactor, one can expect the material to contain from about 0.1 to about 5 parts per million by weight iron based on the weight of the polymerizable mixture. If a free radical initiator is employed, the iron values usually will be from 0.01 to 0.5 parts per million. If the reactor is all mild steel, the iron level usually will be about 10 to 150 parts per million by weight iron based on the weight of the mixture, depending on the configuration of the reactor, the iron values being those expected at polymerization temperature in the presence of free radical initiators. When reactors are used which are partly of mild steel and partly of stainless steel, one can expect the iron level in the reaction mixture to be generally proportional to the surface area of mild steel in contact with the reaction mixture. Generally, if iron is present in concentrations greater than 1 part per million by weight, a free radical initiator is required to induce polymerization at a practical rate. The use of free radical initiators also reduces reactor corrosion. If iron is present in concentrations greater than about 50 parts per million by weight, no significant polymerization occurs even in the presence of initiators which result in an acceptable molding grade polymer. The foregoing is for styrene acrylic acid polymers. Styrene-methacrylic polymers are more readily prepared with iron in the polymerizing mixture.

The invention is further illustrated but not limited by the following examples wherein all parts are parts by weight unless otherwise specified:

EXAMPLE 1

A plurality of polymerization runs were conducted employing a reactor as described in U.S. Pat. No. 3,035,033 wherein four polymerizations were conducted in accordance with the present invention. The results of these polymerizations are set forth in the Table wherein "Feed" indicates the proportion by weight of styrene and acrylic acid in the feed stream to the reactor. Under "Polymer" is designated the weight percent of styrene and acrylic acid in the resultant polymer. "Percent Ethylbenzene" indicates the percentage of ethylbenzene present in the feed stream based on the total weight of styrene and acrylic acid. "ppm" indicates parts per million based on the combined weight of styrene and acrylic acid.

TABLE

|  | 1 | 2 | 3 | 4 |
|---|---|---|---|---|
| Feed - Styrene parts | 90 | 88 | 85 | 80 |
| Feed - Acrylic Acid parts | 5 | 7 | 10 | 15 |
| Polymer - Styrene parts | 93.6 | 89.9 | 87.6 | 82.3 |
| Polymer - Acrylic Acid parts | 6.4 | 10.1 | 12.4 | 17.7 |
| % Ethylbenzene parts | 5 | 5 | 5 | 5 |
| 1,1-bis(t-butyl peroxy)cyclohexane ppm | 500 | 500 | 500 | 500 |
| Polymerization Temp. (°C.) | 122 | 120 | 120 | 119 |
| Solids (weight percent) | 50 | 50 | 50 | 52 |
| Polymer Production Rate (lbs./hr.) | 0.51 | 0.51 | 0.68 | 0.70 |
| 10% Methyethylketone Soln. Visc. (cps) at 25° C. | 10.1 | 11.4 | 11.3 | 18.5 |
| Tensile Strength (pounds per square inch) | 7060 | 7630 | 7470 | 7500 |
| % Elongation | 2.0 | 1.9 | 2.2 | 2.1 |

Similar beneficial improvements in the conversion of monomer and physical properties of the polymer are obtained when the 1,1-bis(t-butyl peroxy)cyclohexane is replaced with 1,1-bis(t-butyl peroxy), 3,3,5-trimethylcyclohexane, 2,2-bis(t-butyl peroxy)butane and 2,2-bis(t-butyl peroxy)hexane. Slightly inferior results are obtained when t-butyl perbenzoate and t-butyl peracetate are employed.

EXAMPLE 2

A styrene-acrylic acid copolymer prepared using the conditions of Run 1 of Example 1 was injection molded into 8-oz tumblers which has a wall thickness of 0.03 inch. The cooling cycle time in the mold was found to be 0.6 seconds. Three different commercially available polystyrene resins showed cooling cycle times of 1.4, 1.7 and 1.7 seconds, respectively.

EXAMPLE 3

A plurality of polymerizations were conducted employing a recirculating coil reactor. The reactor employed a one-inch diameter Type 316 stainless steel tube having a total length of 86 inches. The pump employed was a one-inch gear pump having gears of a material designated as Nitralloy carbon steel and the housing of the pump was grey cast iron. The stainless steel tubing had a volume of about 900 milliliters and an area of 1540 square centimeters. The feed tubing was stainless steel and the pump rotated at a rate to provide recirculation at a rate of 100 reactor volume per hour. Three polymerizations were conducted employing a feed mixture comprising 10 weight percent ethylbenzene, 6 weight percent acrylic acid and about 84 weight percent styrene. The feedstream was pumped into the reactor at a rate of one-half reactor volume per hour. In each of the three polymerizations, the temperature and amount of free radical initiator was chosen such that in an inert reactor (all stainless steel) the rate of conversion of polymer to monomer would be about equal. The first polymerization was conducted without a free radical initiator and at a temperature of 160° C. When a steady state condition was achieved, less than one percent of the effluent stream from the reactant had been converted to polymer and the stream contained more than 100 parts per million of iron based on the total weight of the stream.

A second polymerization was conducted wherein the temperature of the polymerization mixture was maintained at 140° C. and 450 parts per million based on the combined weight of styrene and acrylic acid of tertiarybutyl perbenzoate were added to the feed. When a steady state condition was reached, the reactor effluent contained five parts per million iron and 25.6 weight percent of the styrene and acrylic acid had been converted to polymer. The polymer was satisfactory for extrusion and injection molding.

A third polymerization was conducted wherein 300 parts per million based on the combined weight of the styrene and acrylic acid in the feedstream of 1,1-bis(t-butyl peroxy)cyclohexane, the same peroxy equivalent as employed in the second polymerization. When a steady state had been reached, the reactor effluent contained 11 parts per million of iron based on the effluent and 46 percent of the polymerizable monomers had been converted to polymer which was suitable for molding and extrusion.

EXAMPLE 4

The procedure of Example 3 was repeated with the exception that the feedstream comprised 10 weight percent ethylbenzene, 5 weight percent methacrylic acid and 85 weight percent styrene.

The first polymerization without a peroxy initiator resulted in an effluent stream wherein 30 weight percent of the monomer had been converted to polymer. The effluent contained 65 parts per million of iron. The resultant polymer was highly colored, brittle and unsatisfactory for molding and extrusion.

The second polymerization containing 450 parts per million tertiarybutyl perbenzoate polymerized at 140° C. provided a reactor effluent containing 9 parts per million iron; 47 percent of the monomer was converted to polymer. The polymer was satisfactory for molding and extrusion.

The third polymerization employing 300 parts per million of 1,1-bis(t-butyl peroxy)cyclohexane provided a reactor effluent containing only five parts per million of iron and 50 percent of the polymerizable monomers were converted to a polymer which was suitable for molding and extrusion.

EXAMPLE 5

A polymerization vessel having a volume of 73 gallons made of ASTM Grade C Steel having an agitator was fitted with a reflux condenser. A feedstream of 10 weight percent of ethylbenzene, 5 weight percent methacrylic acid, 85 weight percent styrene, and 300 parts per million based on the combined weight of the styrene and methacrylic acid of 1,1-bis(t-butyl peroxy)cyclohexane was fed to the reactor at a rate of 100 pounds per hour. Material was continuously removed from the reactor at a like rate after 250 pounds of the feedstream material had accumulated in the vessel. The temperature of the polymerizing mixture was maintained at about 124° C. When a steady state was achieved, the effluent from the reactor was 63 percent solids and contained 6 parts per million of iron based on the total weight of the stream. The polymer, after devolatilization had a weight average molecular weight of 270,000 as determined by gel permeation chromatography. The resin appeared colorless and was satisfactory for molding and extrusion.

EXAMPLE 6

Employing the apparatus of Example 5, a continuous polymerization was conducted employing a feedstream consisting of 5 weight percent ethylbenzene, 5½ weight percent acrylic acid, 89.5 percent styrene, and 450 parts per million based on the combined weight of acrylic acid and styrene of 1,1-bis(t-butyl peroxy)cyclohexane. The feedstream was fed to the reactor at a rate of 80 pounds per hour. Three hundred pounds was maintained in the reactor as inventory and the polymerization temperature was 130° with agitation speed of 110 rpm. When the reactor effluent reached a steady rpm. When the reactor effluent reached a steady state, it was 52 weight percent solids. The reactor effluent contained 22 parts per million of iron. The polymer recovered from the effluent by devolatilization of residual monomers and solvent had a weight average molecular weight of 190,000 as determined by gel permeation chromatography. The recovered polymer was clear and had a slight yellow tint but molded and extruded satisfactorily.

EXAMPLE 7

A mixture was prepared which contained 5 weight percent acrylic acid, 10 weight percent ethylbenzene and 85 weight percent styrene; all percentages being based on the combined weight of acrylic acid, ethylbenzene and styrene. The mixture was divided into two portions. To one portion was added 700 parts per million of 1,1-bis(t-butyl peroxy)cyclohexane, the parts per million being based on the total weight of the acrylic acid, ethylbenzene, styrene mixture. Both portions of the mixture were polymerized in glass ampules for a period of one hour. The portion containing the peroxy compound was polymerized at a temperature of 124° C. and the portion without peroxy compound was polymerized at 152° C., the temperature being chosen to provide polymers of essentially the same degree of conversion, same molecular weight and same acrylic acid content. At the end of the one hour period, the sample with the peroxy compound contained 44.2 weight percent solids whereas the sample without the peroxy compound contained 45.2 percent solids. The polymers were removed from the glass ampules and devolatilized in a vacuum oven. The oven was maintained at a temperature of 220° C. and a pressure of two millimeters of mercury. The polymers were devolatilized for a period of 30 minutes. On titration of the polymers to determine the content of the acrylic acid, both showed 7.6 weight percent acrylic acid. Both samples were cooled to room temperature and portions of the polymers analyzed by gas chromatography for the presence of dimers and trimers. The sample prepared employing the peroxy compound contained only 0.11 weight percent dimers and trimers, whereas the sample without initiator contained 0.70 weight percent of dimers and trimers. Gel-permeation chromatography was employed to determine molecular weight. The molecular weight of the sample with the peroxy compound was 200,000 weight average molecular weight and 100,000 number average molecular weight. The sample prepared without the peroxy compound had a weight average molecular weight of 193,000 and a number average molecular weight of 96,000. After devolatilization, samples of both polymers were compression molded and the Vicat heat distortion temperature was determined. The sample prepared employing the peroxy compound had a heat distortion temperature of 255° F. and the sample without the peroxy compound had a heat distortion temperature of 249° F.

In a manner similar to the foregoing examples, other styrene acrylic acid and styrene-methacrylic polymers having compositions within the hereinbefore delineated limits are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a process for the preparation of molding grade polymers having polymerized therein from about 1 to 30 parts by weight of acrylic acid and from about 70 to 99 parts by weight of styrene wherein a stream of a monomeric mixture containing styrene and acrylic acid is passed to a recirculating polymerizing zone and at least a portion of the stream polymerized within the recirculating polymerization zone to form styrene-acrylic acid copolymers the stream containing from 1 to 50 parts per million by weight of iron, the improvement which comprises maintaining the polymerization temperature between about 110° C. and 150° C., initiating polymerization with a free radical generating peroxide initiator.

2. The process of claim 1 wherein the free radical initiator is selected from the group consisting of 1,1-bis(t-butyl peroxy)cyclohexane, 1,1-bis(t-butyl peroxy)-3,3,5-trimethylcyclohexane, 2,2-bis(t-butyl peroxy)butane, 2,2-bis(t-butyl peroxy)hexane, t-butyl perbenzoate and t-butyl peracetate.

3. The process of claim 2 wherein the free radical peroxide initiator is a peroxy ketal of claim 2.

* * * * *